Feb. 22, 1966 C. R. CANTONWINE 3,237,072
TRANSFORMER-LIKE INDUCTION MOTOR HAVING VARIOUS
COUPLING RATIOS BETWEEN WINDINGS
Filed Sept. 21, 1962 2 Sheets-Sheet 1

INVENTOR
Charles R Cantonwine

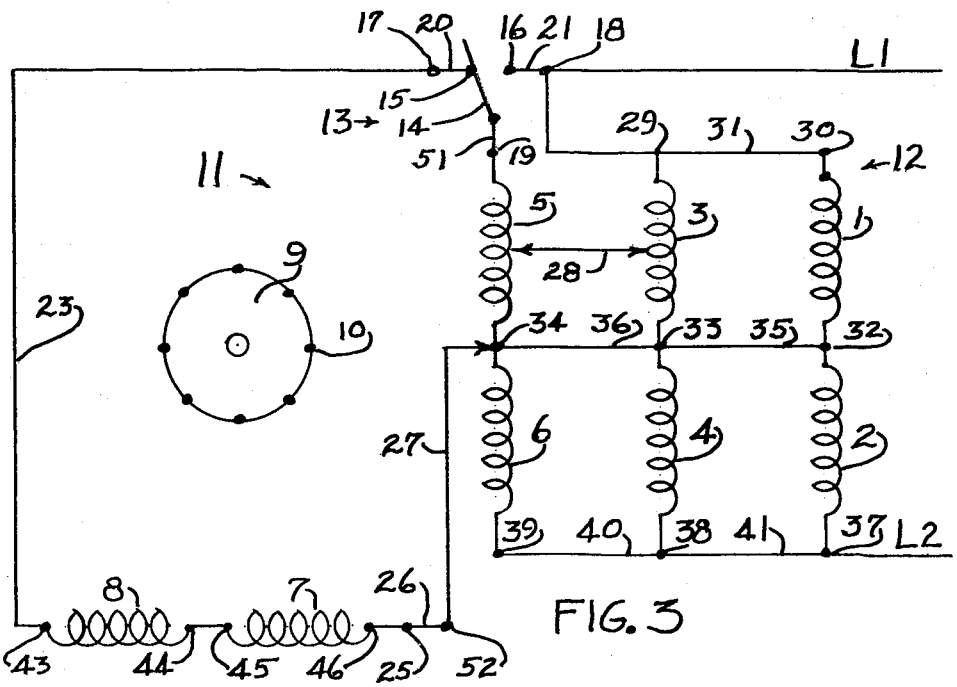
FIG. 3
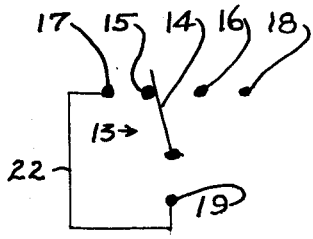
FIG. 4
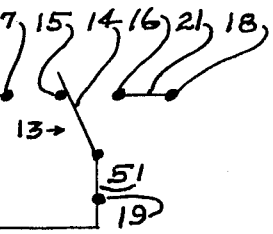
FIG. 5
FIG. 6
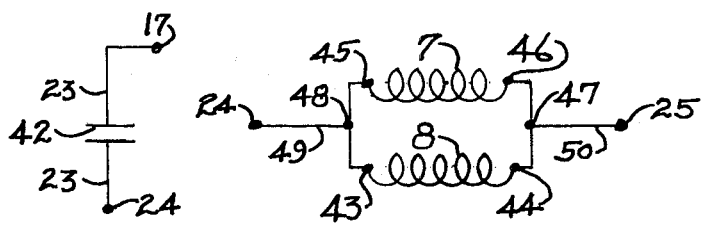
FIG. 7  FIG. 8
INVENTOR
Charles R Cantonwine "# United States Patent Office 3,237,072
Patented Feb. 22, 1966

3,237,072
TRANSFORMER-LIKE INDUCTION MOTOR HAVING VARIOUS COUPLING RATIOS BETWEEN WINDINGS
Charles R. Cantonwine, 950 Airport Road,
Hot Springs, Ark.
Filed Sept. 21, 1962, Ser. No. 225,263
10 Claims. (Cl. 318—220)

This invention relates to motors in general and more particularly to improved means for starting and running alternating current (hereinafter abbreviated A.C.) motors which enables such motors to have reduced starting current without requiring separate impedance devices for starting purposes and without loss of starting torque.

In my patent application Serial No. 661,634, filed May 27, 1957, now Patent No. 3,031,606, issued April 24, 1962 there is described and shown an A.C. motor having parallel connected starting windings.

In my co-pending patent application Serial No. 765,238, now Patent No. 3,068,389, filed October 3, 1958 of which this application is a continuation-in-part, there is shown and described an electric motor construction that utilizes transformer action and the leakage reactance thereof to shift the phase between the main winding current and the starting winding current to develop substantial starting torque.

In my co-pending patent application Serial No. 169,205, filed January 29, 1962 of which this application is a continuation-in-part there is shown and described an electric motor construction that utilizes transformer action and leakage reactance thereof to shift the phase between the current in the main winding and the current in the auxiliary windings.

In my co-pending patent application Serial No. 169,409, filed January 29, 1962 of which this application is a continuation-in-part, there is shown and described an electric motor construction utilizing transformer action and the leakage reactance thereof to provide at least one phase shifting means and uses all of the windings during the running connection.

In my co-pending patent application Serial No. 176,983, now Patent No. 3,150,306, filed March 2, 1962 of which this application is a continuation-in-part, there is shown and described an electric motor construction utilizing transformer action and the leakage reactance thereof to provide at least one phase shifting means and uses all of the windings during the starting and running connection, and also shows and describes parallel connected starting windings.

In the past, it has been the practice to provide A.C. split-phase motors with a high resistance and low inductance starting winding, and a running winding of high inductance and low resistance in order to provide means for shifting the phase of the starting current to provide starting torque. Due to the small angle of phase shift that is produced during starting in the known constructions, the total locked rotor current is almost the numerical sum of the current flowing through the main and starting windings. This means that a relatively high starting current is required and this in turn limited the use of split-phase motors to the lower rating in the fractional horsepower range and forced the use of more costly motor constructions in the larger sizes.

In the past it has been the practice to provide motors beyond the split-phase range with a capacitor to obtain sufficient starting and pull-in torque and to limit the starting current. The capacitor increases the motor cost and has known objectionable features, such as requiring extra space, limited ambient temperature, and limited number of starting cycles and so forth. The present invention overcomes these objectionable features of known capacitor motors by providing a relatively simple motor construction having a starting current, starting and pull-in torques that are comparable to known capacitor start motors, particularly in the two pole construction and for applications such as centrifugal pumps, woodworking machinery, grinders and other applications requiring a high pull-in torque or for loads of high inertia requiring sustained starting periods or frequent starting cycles.

It is therefore a principal object of this invention to provide an A.C. motor having a low starting current without requiring the use of impedance devices and without reducing the capacity and efficiency of the motor.

Another object is to employ transformer action between windings of an A.C. motor to produce phase shift and starting torque.

Another object is to provide an A.C. motor capable of producing an output limited only by the operating conditions of the motor and not by conditions imposed thereon by the starting requirements.

Another object is to reduce magnetic vibration and noise in A.C. motors especially during starting.

Another object is to provide an A.C. motor capable of withstanding sustained and frequent starting periods.

Another object is to reduce the cost of A.C. motors without reducing the horsepower output thereof.

Another object is to provide an A.C. motor that can be wound and made connectable for dual or multiple voltage operation and reversible operation by relatively simple means.

Another object is to provide means for reducing the starting current and cost of A.C. motors which means can be installed as original equipment or added as an improvement on existing motors.

Another object is to prolong the life and reduce the maintenance costs associated with A.C. motors.

Another object is to provide an A.C. motor in which the starting current need not substantially exceed the current in the main winding of a single phase induction motor.

Another object is to provide an A.C. motor that can withstand higher operating and ambient temperatures limited only by the windings and insulation tolerances of the motor windings and not limited by temperature tolerances of capacitors or other phase shifting impedance devices.

Another object is to provide an A.C. motor that eliminates the need for troublesome and costly capacitors for many applications.

Still another object is to provide a self-starting A.C. motor that does not require separate impedance or phase shifting devices, shorted or shaded windings, high resistance windings, or commutators and brushes.

These and other objects and advantages of the present invention will become apparent after considering this specification in conjunction with the accompanying drawings.

In the drawings:
FIG. 1 is a schematic lay-out drawing showing a motor embodying the teachings of the present invention.
FIG. 2 is a schematic wiring diagram of the electrical circuit for the motor shown in FIG. 1.
FIG. 3 is a schematic wiring diagram of another form of the motor shown in FIG. 1.
FIG. 4 is a schematic wiring diagram showing the terminal connections of the motor shown in FIGS. 2 and 3 when it is elected not to use switch 13.
FIG. 5 is a schematic wiring diagram showing the terminal connections of the motor shown in FIG. 2 and FIG. 3 when it is elected to use a part of switch 13.
FIG. 6 is a schematic wiring diagram showing the terminal connections of the motor shown in FIG. 2 and FIG. 3 when it is elected to use a part of switch 13.

FIG. 7 is a schematic wiring diagram showing the terminal connections of the motor shown in FIGS. 2 and 3 when it is elected to provide a capacitor in the auxiliary winding circuit.

FIG. 8 is a schematic wiring diagram showing the terminal connections of the motor shown in FIGS. 2 and 3 when it is elected to provide a parallel connection of the auxiliary or starting windings.

Figure 1:
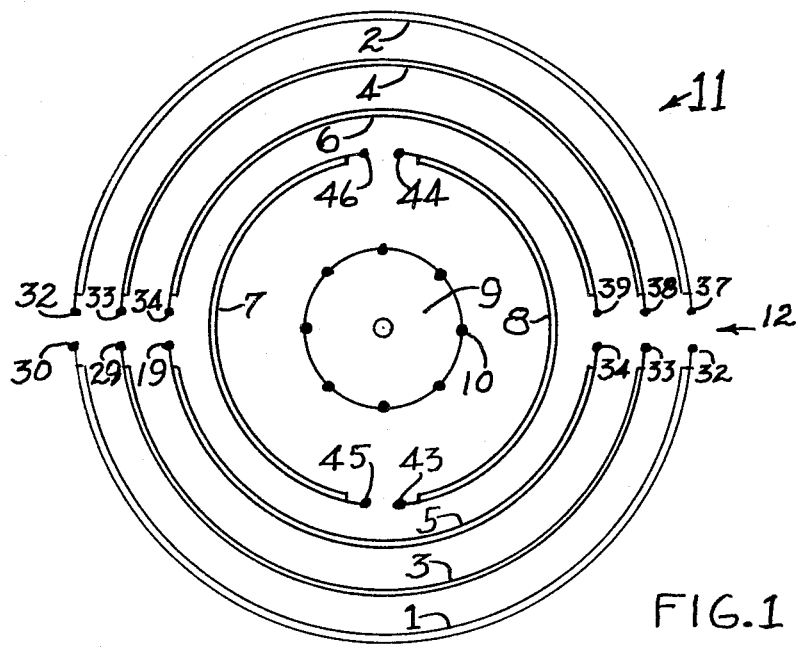

Referring to the drawings by reference numbers, the number 11 in FIG. 1 refers to a motor which has a stator 12 and a rotor 9. The stator 12 has eight windings mounted thereon. These windings are divided into separate portions and are designated as windings 1, 2, 3, 4, 5, 6, 7, and 8. The rotor 9 has a rotor winding designated as winding 10. Although FIG. 1 shows a two-pole motor construction this invention is not intended to be limited to two-pole constructions but may be used with motors having any number of poles. Furthermore, although FIG. 1 shows the stator 12 having eight separate stator windings 1–8 and the rotor 9 having a rotor winding 10, this invention is not intended to be limited to this particular arrangement as either the stator or rotor may be rotatable and the so-called stator windings can be mounted on either the rotating or stationary member depending on the particular requirements of the motor.

In FIG. 1 the stator windings 1, 3, and 5 are positioned to be in mutually inductively coupled relation to each other and may have a coil span of less than 90 electrical degrees or more than 180 electrical degrees. Stator windings 2, 4, and 6 are likewise positioned to be in a mutually inductively coupled relation to each other and are positioned opposite windings 1, 3, and 5 on stator 12 and may have a coil span of less than 90 degrees or greater than 180 degrees. Stator windings 7 and 8 are positioned at a selected space angle relative to stator windings 1, 3, 5, 2, 4, and 6 and, although windings 7 and 8 are shown positioned at approximately 90 electrical degrees relative to stator windings 1, 3, 5, 2, 4, and 6 it is not intended to be limited to this particular arrangement as the elected space angle may be any angle suitable to the particular requirements of the motor, and furthermore the coil span of stator windings 7 and 8 may be any angle less than 90 degrees or greater than 180 degrees.

In FIG. 1 winding 1 has two terminal ends 30 and 32, winding 3 has two terminal ends 29 and 33, winding 5 has two terminal ends 19 and 34, winding 2 has two terminal ends 37 and 32, winding 4 has two terminal ends 38 and 33, winding 6 has two terminal ends 39 and 34, winding 7 has two terminal ends 45 and 46, and winding 8 has two terminal ends 43 and 44. The energized portions of stator windings 1, 3, and 5 will generate (for example) a south magnetic pole at the 6 o'clock position on FIG. 1, and at the same instant the energized portions of stator windings 2, 4, and 6 will generate a north magnetic pole at the 12 o'clock position. Stator windings 7 and 8 will generate a north and south pole (for example) at the 9 o'clock and 3 o'clock positions respectively.

In FIG. 1, although the stator windings 1–8 as shown having a coil span of approximately 180 electrical degrees it is intended that the coil span not be limited to this angle but may be any angle between 90 and 180 degrees or even less than 90 degrees or greater than 180 degrees. It is not always necessary that all windings have the same coil span, some windings may have a different span than others, wound concentric, overlapping or any other known arrangement.

Figure 2:
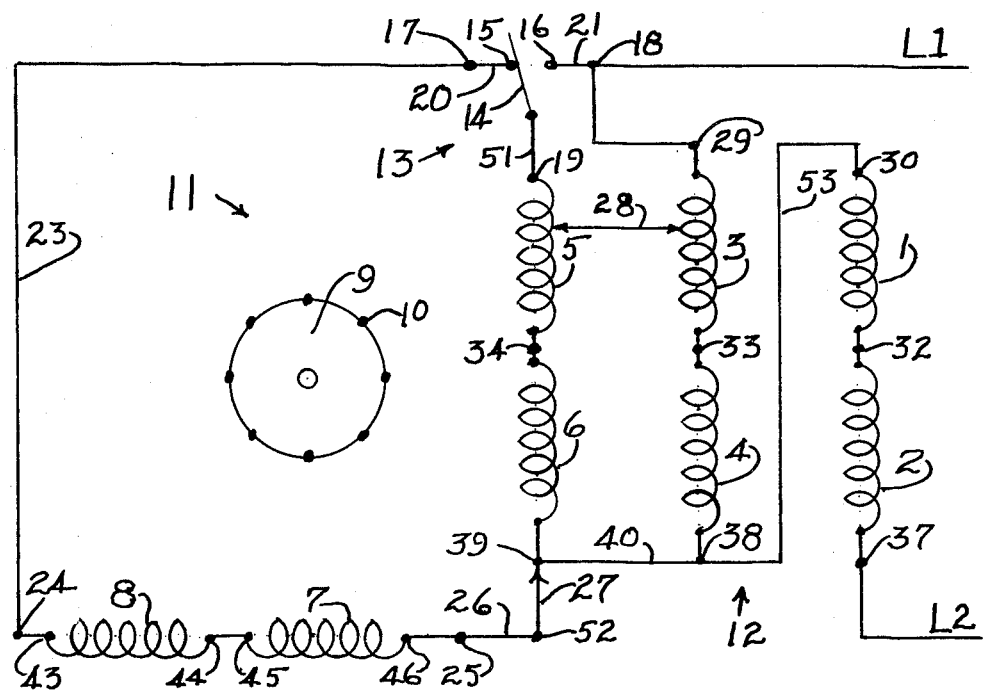

FIG. 2 is a schematic wiring diagram of the motor 11 in FIG. 1 and is shown in the starting condition, with power leads L1 and L2 connected to an A.C. source of energy. The line lead L1 is connected to one end of stator winding 3 at terminal 29 through junction 18, junction 18 is also connected by lead 21 to stationary contact 16 located on speed responsive switching device 13. The switch 13 may be a mechanically operated speed responsive switch of known type or it may be a relay device (not shown) which is responsive to speed changes as reflected by voltage or current changes in any part of the motor circuit. The other end of winding 3 is connected to one end of winding 4 at terminal 33, the other end of winding 4 at terminal 38 is connected by lead 53 to one end of winding 1 at terminal 30, the other end of winding 1 is connected to one end of winding 2 at terminal 32, the other end of winding 2 terminal 37 is connected to line lead L2. This connects mutually inductively coupled windings 1 and 3 in series circuit with mutually inductively coupled windings 2 and 4 and across an A.C. source of energy to comprise the primary winding portion of the main motor winding. Terminal 38 is also connected by lead 40 to one end of winding 6 at terminal 39, the other end of winding 6 is connected to one end of winding 5 at terminal 34, the other end of winding 5 terminal 19 is connected by lead 51 to movable contact 14 of switch 13, movable contact 14 engages stationary contact 15 during starting conditions. Stationary contact 15 is connected by lead 20 to terminal 17 which is connected by lead 23 to terminal 24 and to one end of winding 8 at terminal 43, the other end of winding 8 terminal 44 is connected to one end of winding 7 terminal 45, the other end of winding 7 terminal 46 is connected to terminal 25 which is connected by lead 26 to terminal 52, terminal 52 is connected to lead 27. Lead 27 terminating in an arrow to indicate that lead 27 can be made adjustable or permanently connected to any other position. Lead 27 may be connected within the windings, to any intermediate position on winding 5, to terminal 34, to any intermediate position on winding 6, to terminal 39, or to any of the other windings, such as to winding 1, terminal 32, winding 2 or to terminal 37. Windings 5 and 6 are thus connected in series and designated as the secondary portion of the main motor winding. Windings 7 and 8 are thus connected in series and are designated as the auxiliary or starting windings portion of the stator winding. Jumper 28 is a cross connection between a part of the primary portion and the secondary portion of the main motor winding. Jumper 28 may be positioned permanently or made adjustable between two intermediate points on windings 3 and 5, across terminals 33 and 34, or at any intermediate point between windings 4 and 6 including the connection between terminals 38 and 39 which, in effect, is the same as eliminating jumper 28 entirely. With no jumper 28 connection the motor 11 will have a minimum starting current and starting torque. Jumper 28 provides a means of increasing the starting torque and starting current having maximum values when positioned at a selected position as shown in solid line between windings 3 and 5, which will be explained in greater detail hereinafter.

In FIG. 2, with the primary portion of the main winding energized, an out of phase current is induced, by transformer action in the secondary portion of the main winding, which is conducted to the auxiliary or starting winding to produce starting torque which will be explained hereinafter. As the motor speed increases to a predetermined speed, the transfer switch 13 operates to change from a starting to a running condition whereby movable contact 14 disengages stationary contact 15 and simultaneously engages movable contact 14 with stationary contact 16. In the running position of switch 13, a part of the primary portion, windings 3 and 4 in series, is connected in parallel with the series connected secondary portion windings 5 and 6, and the auxiliary or starting windings 7 and 8 are disconnected from the secondary portion. The jumper 28, when used, is preferably connected to points of equal potential under the running conditions, however, during the starting conditions there will be substantial current flowing through jumper 28 which will be explained hereinafter. For dual-voltage operation such as alternatively connecting the motor 11 to operate on either 115 or 230 volts, the motor 11 may be connected as shown in FIG. 2 for 230 volts, but for 115 volts remove lead 53 and connect terminal 38 to terminal 37, also connect terminal 30 to terminal 29 and line lead L1 through junction 18.

In FIG. 2, the primary windings 1, 2, 3, and 4 are closely coupled to the secondary windings 5 and 6. However, when it is elected to use jumper 28, it can be said that the secondary portion is relatively more closely coupled to at least one of the primary portions than to the others. The connections as shown forms a Y connection wherein the phase is different in each of the three portions of the Y, at least during the starting condition. Windings 3 and 4 comprise the upper right leg of the Y, or first section, windings 5 and 6 comprise the upper left leg of the Y, or second section, and windings 1 and 2 comprise the lower stem of the Y, or third section. Even with the jumper 28 connected as shown and the two windings between the jumper 28 and terminals 38 and 39 considered as an equivalent single winding, there is formed an extended similar Y connection. When it is elected to use jumper 28, the connection is defined as connecting at least a part of the primary portion and the secondary portion together at one end and at an intermediate point on each, to form a parallel portion thereof.

In FIG. 2 primary windings 1, 2, 3, and 4 may be considered as one continuous winding and secondary windings 5 and 6 tapped in at an intermediate point, such as terminal 39 connecting terminal 38 by lead 40, on the primary winding anywhere between the two terminal ends terminal 29 and 37. Windings 1, 2, 5 and 6 can likewise be considered as one continuous winding with a part of the primary winding, windings 3 and 4, tapped into the winding at an intermediate point, such as terminal 38 connecting terminal 39 by lead 40, on the other continuous winding anywhere between terminals 19 and 37. And starting windings 7 and 8 may likewise be tapped into any point on windings 1, 2, 3, 4, 5 and 6 as shown for some of the possible combinations. Any or all of the aforementioned taps may be made by connecting within the respective windings, at the terminal ends or at junctions of the motor circuit. Said taps as well as the jumpers 28 may be permanent connection means or by switch means if desired. The secondary winding portions, although shown connected to the primary windings, may be separate and insulated therefrom under certain conditions such as for use with the connections shown in FIGS. 4 and 5.

FIG. 3 is a schematic wiring diagram of the motor 11 in FIG. 1 and is shown in the starting condition, with power leads L1 and L2 connected to an A.C. source of energy. The line lead L1 is connected to junction 18 which is connected to one end of winding 1 terminal 30, through terminal 29 and lead 31, the other end of winding 1 is connected to one end of winding 2 at terminal 32, the other end of winding 2 terminal 37 is connected to line lead L2. Terminal 29 is one end of winding 3, the other end of winding 3 is connected to one end of winding 4 at terminal 33, the other end of winding 4 terminal 38 is connected by lead 41 to terminal 37 and line lead L2. Junction 18 is connected by lead 21 to stationary contact 16 located on speed responsive switch 13. Movable contact 14 located on switch 13 is connected by lead 51 to one end of winding 5 terminal 19, the other end of winding 5 is connected to one end of winding 6 at terminal 34, the other end of winding 6 terminal 39 is connected by lead 40 through terminal 38 through lead 41 through terminal 37 to line lead L2. Terminal 32 is connected by lead 35 to terminal 33 and terminal 33 is connected by lead 36 to terminal 34. Movable contact 14 of switch 13 engages stationary contact 15 during the starting condition. Stationary contact 15 is connected by lead 20 to terminal 17, terminal 17 is connected by lead 23 to terminal 24, terminal 24 is connected to one end of winding 8 at terminal 43, the other end of winding 8 terminal 44 is connected to one end of winding 7 at terminal 45, the other end of winding 7 terminal 46 is connected to terminal 25, terminal 25 is connected by lead 26 to terminal 52, terminal 52 is connected to lead 27. Lead 27 terminating in an arrow to indicate that lead 27 can be made adjustable or permanently connected to any other position. Lead 27 may be connected within the windings, to any intermediate position on winding 5, to terminal 34, to any intermediate position on any or all of windings 6, 4, and 2, or to terminal 39, and can also be connected within winding 1, and/or 3, to terminal 32, within winding 2 and/or 4, and/or 6, or to terminal 37.

It is anticipated that any of the permanently parallel connected windings such as 1 and 3, or windings 2, 4, and 6, may be wound as an equivalent single winding. Windings 1 and 3 comprise the closely coupled primary portion, or first section, of the main motor winding. Winding 5 comprises the secondary portion, or second section of the main motor winding. Windings 2, 4, and 6 comprise a loosely coupled primary portion, or third section, or portion common to both the closely coupled primary and secondary portions. Windings 7 and 8 are connected in series, as shown, but may be connected in parallel as shown in FIG. 8, and are designated as the auxiliary or starting windings portion, or fourth section of the stator winding.

Jumper 28 is a cross connection between the said first and second sections and serve the same purpose as explained under FIG. 2. Jumper 28 may be positioned, permanently or made adjustable between two intermediate points on a part of or all of the primary portion and secondary portion. Jumper 28 may be connected between windings 5 and 3, between windings 5 and 1, or 5, 3, and 1 together. When jumper 28 is connected across terminals 34, 33 and 32 it is, in effect, the same as eliminating jumper 28 entirely.

In FIG. 3, with the primary portion, windings 1 and 3, and the common portion or third section, windings 2, 4, and 6 energized, an out of phase current is induced, by transformer action, in the secondary portion, or second section winding 5 which is conducted by means to the auxiliary or starting winding to produce starting torque. As the motor speed increases the switch 13 operates at a predetermined speed to change from a starting to running condition whereby movable contact 14 disengages stationary contact 15 and simultaneously engages movable contact 14 with stationary contact 16. In the running position of switch 13 the secondary portion, winding 5, is connected in parallel with the primary portions, windings 1 and 3 and the last named parallel windings connected in series with the parallel connected common portion windings 2, 4, and 6 and across the A.C. source, and the auxiliary or starting windings 7 and 8 are disconnected during the running condition.

In FIG. 3, for dual voltage operation such as alternately connecting the motor 11 to operate (for example) on either 115 or 230 volts, the motor may be connected as shown in FIG. 3 for 230 volts, but for 115 volts the pole winding group consisting of windings 2, 4, and 6 would be connected in parallel with part of the pole winding group consisting of windings 1 and 3, and across the A.C. source. In a four pole motor, for example, one pole winding group could be wound with a primary winding 1 and 3 and secondary winding 5, and each of the other three pole winding groups of the main winding could be wound with and connected as an equivalent single winding, such as windings 2, 4, and 6. With each pole winding group wound for 115 volts operation, all four pole winding groups could then be connected in parallel for 115 volt operation, and the four pole groups could be connected in series-parallel or parallel-series for 230 volt operation. In this particular example, the four pole winding groups could also be connected in series for 460 volt operation to provide multi-voltage operation.

In FIG. 3 the primary windings 1 and 3 are closely coupled to the secondary winding 5, and comprise a part of the pole winding groups. Primary windings 2, 4, and 6 are loosely coupled by induction to windings 1, 3, and 5 and comprise the remainder of the pole winding groups. The connections as shown form a Y connection wherein the phase is different in each of the three portions of the Y, at least during the starting conditions. Windings 1 and 3 in parallel comprise the upper right leg of the Y, or first section, winding 5 comprises the upper left leg of the Y, or second section, and windings 2, 4, and 6 comprise the lower stem of the Y, or third section. Even with the jumper 28 connected as shown and the windings between the jumper 28 and terminals 34, 33 and 32 considered as an equivalent single winding, there is formed an extended similar Y connection. When it is elected to use jumper 28, the connection is defined as connecting at least a part of the primary portion and the secondary portion together at one end and at an intermediate point on each.

It should be noted that in either FIG. 2 or FIG. 3, the jumper 28 may be connected within the pole winding groups or at terminal ends of the pole winding groups. Likewise lead 27 may be connected within the pole winding groups or at terminal ends of the pole winding groups, or at junctions of the motor circuit.

In FIG. 3 parallel connected primary windings 1 and 3 shown in series with parallel connected windings 2, 4, and 6 may be wound as one continuous and equivalent single winding with secondary winding 5 tapped in at an intermediate point such as terminal 34, on the primray winding anywhere between the terminal ends, one terminal end represented by terminals 29 and 30 connected by lead 31, and the other terminal end represented by terminals 37, 38, and 39 connected together by leads 41 and 40 respectively. Winding 5 connected as shown in series with parallel connected windings 2, 4, and 6 may likewise be considered as one continuous winding with the closely coupled part of the primary winding, winding 1 or parallel connected windings 1 and 3, tapped into the said continuous winding at an intermediate point such as at a point represented by terminals 32 and 33 and lead 35, said tap may be located on the continuous winding anywhere between terminal end 19 as one end, and the other terminal end as represented by terminals 37, 38 and 39 connected together by leads 41 and 40 respectively. Said taps, as well as the jumper 28, may be permanent connection means or by switch means if desired. Starting windings 7 and 8 may likewise be tapped into any point on windings 1–6 inclusive as shown for some of the possible combinations. Any or all of the aforementioned taps may be made within the respective windings, at the terminal ends or at junctions of the motor circuit.

In FIG. 3 the secondary winding portions, although shown connected to the primary winding portions, may be separate and insulated therefrom under certain circumstances such as shown in FIGS. 4 and 5.

FIG. 4 is a schematic wiring diagram showing the terminal connections to motor 11 of FIGS. 2 and 3 when it is elected to eliminate switch 13 entirely under certain conditions. FIG. 4 shows lead 21 removed from between junction 18 and stationary contact 16, and lead 20 is removed from between terminal 17 and stationary contact 15, and lead 51 removed from between terminal 19 and movable contact 14, and terminal 17 is connected by lead 22 to terminal 19. This connection provides for a starting and running connection identical to the starting connections shown in FIGS. 2 and 3. Switch 13 is unnecessary and of course would be eliminated entirely. This connection has particular advantages in that the starting winding can be positioned at a space angle less than 90 electrical degrees, such as about 30 degrees, and obtain lower running current than would otherwise be obtained with a similarly connected conventional split-phase motor having the starting winding across the line during the running connection. Also there are particular advantages in this switchless connection using a capacitive reactance such as shown in FIG. 7, and furthermore the motor is instantly reversible.

FIG. 5 is a schematic wiring diagram showing the terminal connections to switch device 13 of FIGS. 2 and 3 when it is elected to start the motor with the same identical connections under starting conditions shown in FIGS. 2 and 3, but during the running connection the starting windings 7 and 8 are disconnected. During the running connection, at least a part of the secondary portion, windings 5 and 6 of FIG. 2, and at least a part of winding 5 in FIG. 3 will remain idle or disconnected. This is accomplished by omitting lead 21 from between junction 18 and stationary contact 16. Stationary contact 16 is unnecessary and switch 13 would be comprised of only one movable contact 14 and one stationary contact 15. This connection has the advantage of simplifying the switch 13 however, the secondary remains idle during the running condition.

FIG. 6 is a schematic wiring diagram showing the terminal connections to switch 13 of FIGS. 2 and 3 when it is elected to start the motor with the same identical connections shown in FIGS. 2 and 3, but during the running connection the starting windings 7 and 8 would not be disconnected but would be left in the circuit, with the primary and secondary portions connected in parallel the same as in FIGS. 2 and 3 during the running connection. This is accomplished by removing lead 20 from between terminal 17 and stationary contact 15 and by connecting terminal 17 by lead 22 to terminal 19. This connection has particular advantages particularly in conjunction with the circuit using a capacitive reactance such as shown in FIG. 7.

FIG. 7 is a schematic wiring diagram showing the terminal connections to the starting circuit of motor 11 FIGS. 2 and 3 when it is elected to use a capacitive reactance as an additional phase shifting means during the starting, or starting and running conditions. A capacitive reactance 42 is inserted in lead 23 between terminals 17 and terminal 24 of FIGS. 2 and 3. Capacitive reactance 42 may be of the electrolytic type of construction hereinafter referred to as a capacitor, or it may be of the dielectric type of construction hereinafter referred to as a condenser. The capacitor is known to have a voltage-time-temperature limit and is therefore usually used for intermittent or starting duty only, at rated voltage. However, it is well known that, at considerably reduced voltage, the capacitor can operate within its temperature limits if used for continuous service. This invention provides a means of utilizing the lower cost capacitor to replace the condenser for permanent-split condenser motor operation. This is accomplished by connecting lead 27 of FIGS. 2 and 3 at a point that will develop low voltage across the capacitor, and by using the switch 13 arranged as shown in FIG. 4 or FIG. 6 energize the auxiliary windings 7 and 8 through capacitor 42. Of course capacitor or condenser 42 of FIG. 7 can be advantageously applied in any of the circuits of FIGS. 2, 3, 4, 5, 6, and 8 or any combination thereof. It is not always necessary to include the secondary portion or any part thereof, to tap off a low voltage suitable for capacitor 42 and auxiliary windings 7 and 8 to provide a capacitor start or capacitor start and run or permanent split capacitor motor. The low voltage may be tapped off at any suitable location on the main winding. The secondary windings of FIGS. 2 and 3 can be arranged to step-up or step-down the line voltage to fully utilize the capacitor or condenser voltage rating. The starting circuit, consisting of a capacitive reactance in series with the starting winding, can be advantageously connected across selected locations on the main winding portion to obtain a different voltage across the capacitive reactance under starting conditions than under running conditions, such as connect a capacitive reactance across terminals 17 and 18 of FIG. 4 (not shown), or FIGS. 2, 3 and 5.

FIG. 8 is a schematic wiring diagram showing the terminal connections to the starting circuit of motor 11 of FIGS. 2 and 3 when it is elected to connect the starting or auxiliary windings 7 and 8 in parallel instead of series arrangement as shown in FIGS. 2 and 3. This is accomplished by removing from FIGS. 2 and 3, windings 7 and 8, and terminals 43, 44, 45 and 46, and reconnecting windings 7 and 8 as shown in FIG. 8. Connect terminal 24 (FIGS. 2 and 3) by lead 49 to junction 48, junction 48 is connected to one end of winding 7 at terminal 45, the other end of winding 7 terminal 46 is connected to junction 47, junction 47 is connected by lead 50 to terminal 25 (FIGS. 2 and 3). Junction 48 is also connected to one end of winding 8 at terminal 43, the other end of winding 8 terminal 44 is connected to junction 47, junction 47 is connected by lead 50 to terminal 25 (FIGS. 2 and 3). This provides a parallel connected starting winding of at least two parallel circuits and has an advantage of providing a higher starting and pull-in torque and quieter operation. In addition, this parallel connection provides a means of reducing the starting or auxiliary winding impedance as well as reducing the inductive reactance to one-fourth and the counter E.M.F. to one-half of the values when the windings are series connected. The circuit of FIG. 8 may be used to advantage in conjunction with any of the disclosures shown in FIGS. 2, 3, 4, 5, 6 and 7 or any combination thereof.

In the starting condition of motor 11, as described, the input voltage is impressed across the primary portion of the main winding which acts as the primary of a transformer being magnetically coupled to the secondary portions of the main winding, which acts as the transformer secondary. At standstill the inductive coupling between the primary portions and the winding 10 of rotor 9 has a relatively low impedance and causes considerable leakage reactance. It is well known that transformer leakage reactance causes a phase shift between the primary and secondary currents and a reduction of the secondary voltage beyond the normal IR voltage drop, but it has never been known to use this principle in motor construction to shift the phase and develop starting torque. The coupling between the primary and secondary portions, however, effects a current flow in the starting windings 7 and 8 which is at this time connected in series with at least a part of the secondary portion. Since the starting windings 7 and 8 are positioned on the stator 12 at a space angle relative to the primary and secondary portions of the main winding, and since the voltage induced in the secondary portion is approximately 180 degrees out of phase with the voltage across the primary, by known transformer action, the current flowing in the secondary portion and the starting windings is out of phase with the current flowing in the primary portion. Furthermore, a certain amount of leakage reactance is also present, due to the loading of the secondary portion by the starting winding, as well as the loading caused by the rotor winding 10, which causes the current (or flux) produced in the starting windings 7 and 8 to lag behind the current (or flux) produced in the primary portion of the main winding, by an angle which is even greater that the 180 degrees produced by the transformer action. This effect of leakage reactance preferably shifts the phase of the secondary current to a position nearer 270 degrees out of phase with the primary portion current, and in effect, is the same as a 90 degree leading current in the starting windings 7 and 8.

The size of the conductors used for the starting windings 7 and 8 can be larger in cross-section in the present motor than in conventional split phase motors because the windings 7 and 8 do not depend on resistance to split the phase or produce the desired phase shift. However, even if starting windings 7 and 8 are of the high resistance type as used in conventional split phase motors it would not load down the secondary portion sufficiently to produce the necessary leakage reactance for maximum phase shift and torque, but would simply operate as a reduced current, reduced torque conventional split phase motor. For example, the starting windings 7 and 8 can be the same as the main winding in wire size and number of turns in the subject motor 11, and if connected as specified herein, relatively high starting torque will be developed. However, if this same winding is connected as a conventional split phase motor it would develop no starting torque whatsoever because the starting winding then would not have its current out of phase with the current in the main winding. The starting windings 7 and 8 for maximum phase shift and torque, will be found to have lower resistance than the starting winding of a conventional split phase motor, and in most cases will have equal or lower resistance than the starting windings of known capacitor start motors. It is possible for example to obtain approximately a 90 degree phase shift in motor 11 which provides a relatively quieter starting motor.

The present motor construction does not strictly comply with the commonly accepted definition of a split phase motor because it does not use a high resistance starting winding connected across the power source. Furthermore, the present motor does not fall into the general class of motors using external impedances. Therefore, since the positioning of the windings and the reactive coupling therebetween provides the only means for shifting the phase in the present motor construction, the present motor might possibly be classified as a hybrid type of split phase motor such as a high impedance start split phase motor or as a leakage reactance split phase motor.

Although the pole winding groups are shown in FIG. 2 and FIG. 3 to be series connected for reasons of illustration it is not intended to limit the present invention to this arrangement. Each pole winding group or parts thereof and/or each main or starting winding portion, may have one or more elements and be connectable in parallel, series, series-parallel, parallel-series, or any combination thereof and be fully within the scope of this invention. Furthermore, the expression "windings energized by A.C. or an A.C. source" or words to that effect as used herein is intended to broadly define any of the above mentioned possible connections and is not necessarily limited to any particular connection.

In FIGS. 2 and 3 the jumper 28 is provided to connect portions of the main primary and secondary windings in parallel. Preferably the jumper 28 is connected to equipotential points on the windings under running conditions so that little or no current will flow through the jumper during running connection. In the starting connection, however, it is expected that current will flow through the jumper. The purpose of the jumper is to increase the starting current and starting torque of the motor in about the same ratio by connecting preselected portions of the primary and secondary windings in parallel. This reduces the effective impedance of these windings as connected across the source and also as connected in the starting circuit. Therefore, by this arrangement more starting current and torque can be obtained than would otherwise be possible. The starting current and starting torque can be further increased by using a relatively low impedance starting winding 7 and 8. By changing the location of the connection of the jumper 28, the starting characteristics can also be changed. It should also be noted that the jumper 28 as shown in FIGS. 2 and 3 connects the main winding portions as an equivalent Y connection wherein the parallel connected portions form a part of one leg thereof.

It is anticipated and intended that the drawings FIGS. 1–8 may be used interchangeably where applicable, for example, FIGS. 4 to 8 may be applied to FIG. 2 and FIG. 3 alone or in any combination thereof.

Good results were obtained by simply reconnecting, without rewinding or changing in any other way, a standard 1 hp. 3450 r.p.m. 115/230 volt 60 cy. 1 ph. capacitor start NEMA jet pump motor, connecting as shown in FIG. 2 so that it could be directly compared as a leakage reactance split phase motor against the original capacitor start motor without regard for accuracy of absolute values of test data. The motor, as originally wound, had two conductors in strand arrangement in each of the two main winding portions. In one of these portions the two conductors were separated to provide one conductor serving as the primary portion windings 3 and 4 in FIG. 2 and the other conductor serving as the secondary portion windings 5 and 6, the other main winding portion, consisting of two conductors in strand served as the other primary portion windings 1 and 2. The original starting windings 7 and 8 were connected as shown in FIG. 2 with the capacitor removed, or shorted out. With lead 27 connected to terminal 39 and jumper 28 connected between terminals 34 and 33 the motor developed approximately the same starting torque and pull-in torque at substantially less current as when connected as the original capacitor motor. With jumper 28 connected as shown in solid line between winding 5 and winding 3 at about the mid point on each, the torque was increased over the capacitor motor at approximately the same starting current. Approximately the same or superior results were therefore obtained at a cost saving of approximately the cost of the capacitor and mountings, plus other known advantages resulting from the elimination of the capacitor. A motor wound and proportioned as a leakage reactance motor shows even greater improvements over a capacitor start motor particularly for two pole motors where high pull-in torque is desirable. For example, this dual-voltage motor model provided a conductor size ratio of 3 to 1 between the primary and secondary portions. A more desirable ratio has been found to be approximately 2 to 1 whereby the torques are increased substantially.

It is therefore believed that this invention is an improvement in known constructions and has immediate commercial usefulness and value to related industries.

Thus, it is apparent that there has been described a novel motor construction which makes use of the inductive and reactive characteristics of the windings themselves to produce the desired starting torque and which operates in a highly efficient and balanced condition during the starting and running operation, and which fulfills all of the objects and advantages sought therefor. It is to be understood that the foregoing description and the accompanying drawings have been presented only by way of illustration and example, and that changes, modifications and alterations in the present disclosure, which will be readily apparent to one skilled in the art, are contemplated as being within the scope of the present invention which is limited only by the claims which follow.

What I claim is:

1. An A.C. motor comprising a stator having a stator winding thereon and a rotor having a rotor winding thereon, one of said windings having at least one main winding portion and at least one auxiliary winding portion positioned at a selected space angle relative to said main winding portion, said main winding portion consisting of at lease two primary winding sections and at least one secondary winding section, said primary winding sections energized by an A.C. source, and one of said primary winding sections be mutually inductively coupled in closer relationship than the other to said secondary winding section, means connecting one terminal end of said secondary winding section to one selected terminal end on each of two of said at least two primary winding sections, means connecting said auxiliary winding portion to selected points on said at least one main winding portion, said means connecting said auxiliary winding portion so as to be energized by A.C. in part at least from at least a part of said secondary winding section, means providing at least one phase shifting means, including leakage reactance means, to change the phase of the current in the said auxiliary winding portion relative to the current in the said primary winding sections of said main winding portion, at least during the starting of said motor.

2. The motor defined in claim 1 wherein said at least one auxiliary winding portion is disconnected, by speed responsive switch means, from the said main winding portion during the running condition of said motor.

3. The motor defined in claim 1 wherein said at least one auxiliary winding portion be disconnected, by speed responsive switch means, from the said main winding portion, and said switch means connecting said secondary winding section in parallel with at least a part of said primary winding sections during the running condition of said motor.

4. The motor defined in claim 1 wherein the said at least one secondary winding section be connected by speed responsive switch means in parallel with at least a part of said primary winding sections during the running condition of said motor.

5. The motor defined in claim 1 wherein said at least one phase shifting means include a capacitive reactance means connected to form a series circuit with the said at least one auxiliary winding portion.

6. The motor defined in claim 1 wherein said at least one auxiliary winding portion be arranged and connected to form at least two parallel circuits.

7. The motor defined in claim 1 wherein the said at least one secondary winding section and at least a part of the said at least two primary winding sections be connected together at one end and at one intermediate point on each to form a parallel portion thereof.

8. An A.C. motor comprising a stator having a stator winding thereon and a rotor having a rotor winding thereon, one of said windings consisting of a main winding portion and a starting winding portion positioned at a selected space angle relative to the said main winding portion, said main winding portion consisting of a first primary section magnetically coupled in close relationship to a secondary section, said first primary and secondary scetions to comprise at least one pole winding group, and a second primary section magnetically in loose coupled relationship to said first primary and secondary sections, said second primary section to comprise the remainder of the pole winding groups not occupied by the said first primary and said secondary sections, said main winding portion arranged and connected to form a Y connection wherein the said first primary and secondary sections comprise the two upper legs of the Y and the said second primary section to comprise the lower stem of the Y connection, means connecting an A.C. source of energy across the series connected said first and second primary sections, and means connecting the said starting winding portion to selected locations on said main winding portion including at least a part of said secondary winding section, the leakage reactance between the said first and second primary sections, and the said secondary sections providing at least one means of shifting the phase relation of the current in the said starting winding portion relative to the current in the said first and second primary sections.

9. A multi-voltage leakage reactance split-phase A.C. motor comprising a stator having a stator winding thereon and a rotor having a rotor winding thereon, one of said windings consisting of a main running winding portion and a starting winding portion positioned at a selected space angle relatve to said main running winding portion, said main running winding portion consisting of a first primary section magnetically coupled in close relationship to a secondary section, said first primary and secondary sections to comprise at least one pole winding group, and a second primary magnetically in relatively loose coupled relationship to said first primary and secondary sections, said second primary section to comprise the remainder of the pole winding groups not occupied by the said first primary and secondary sections, means connecting said first and second primary sections to an A.C. source and energized thereby and alternatively connectable to operate said motor from at least two different source voltages, and speed responsive switch means movable between a starting position when the motor is operated at less than a preselected speed and a running position when the motor speed exceeds said preselected speed, means including the starting position of said switch means connecting one terminal end of said starting winding portion to one terminal end of the said secondary section, and connecting the other terminal end of said starting winding portion to a selected position on the said main running winding embracing at least a part of the said secondary section and energized by A.C. therefrom, and means including the running position of said switch means disconnecting the said starting winding portion and connecting the said secondary section in parallel with the said first primary section.

10. A leakage reactance split phase A.C. motor comprising a stator having a stator winding thereon and a rotor having a rotor winding thereon, one of said windings having a plurality of main winding portions and at least one auxiliary winding portion positioned at an elected space angle relative to said main winding portions, said main winding portions consisting of a plurality of primary sections and at least one secondary section, said secondary section positioned to be magnetically coupled to at least one of the primary sections in a more closely coupled relationship than to the others of said primary winding sections, means energizing said primary winding sections by an A.C. source, means connecting at least a part of said at least one of said secondary sections in a closed circuit with said auxiliary winding portion at least during the starting condition of said motor, means providing at least one phase shifting means including leakage reactance means.

References Cited by the Examiner
UNITED STATES PATENTS 1,894,124   1/1933   Schaefer _____ 318—220
2,864,986  12/1958   Hutchins et al. _____ 318—220

ORIS L. RADER, *Primary Examiner.*

G. Z. RUBINSON, C. E. ROHRER, *Assistant Examiners.*